(12) United States Patent
Duan et al.

(10) Patent No.: US 7,298,906 B2
(45) Date of Patent: Nov. 20, 2007

(54) HIERARCHICAL DETERMINATION OF FEATURE RELEVANCY FOR MIXED DATA TYPES

(75) Inventors: Baofu Duan, Cleveland Heights, OH (US); Zhuo Meng, Broadview Heights, OH (US); Yoh-Han Pao, Cleveland Heights, OH (US)

(73) Assignee: Computer Associates Think, Inc., Islandia, NY (US)

( * ) Notice: Subject to any disclaimer, the term of this patent is extended or adjusted under 35 U.S.C. 154(b) by 353 days.

(21) Appl. No.: 11/068,185

(22) Filed: Feb. 28, 2005

(65) Prior Publication Data

US 2005/0149518 A1 Jul. 7, 2005

Related U.S. Application Data

(63) Continuation-in-part of application No. 10/615,885, filed on Jul. 8, 2003.

(51) Int. Cl.
G06K 9/46 (2006.01)

(52) U.S. Cl. .................. 382/195; 382/173

(58) Field of Classification Search .......... 382/173, 382/190, 195, 209, 225, 282, 288; 707/4–10
See application file for complete search history.

(56) References Cited

U.S. PATENT DOCUMENTS 6,865,582 B2 * 3/2005 Obradovic et al. ...... 707/104.1
2004/0019574 A1 1/2004 Meng et al. .............. 706/15

FOREIGN PATENT DOCUMENTS

WO WO 2005/008571 1/2005

OTHER PUBLICATIONS

Ichino "General metrics for mixed features", IEEE, pp. 494-497, 1988.*
Li, et al "Unsupervised learning with mixed numeric and nominal data", IEEE, pp. 673-690, 2002.*
Biswas, et al "ITERATE: A conceptual clustering method for knowledge discovery in databases", Vanderbilt University, pp. 1-29, 1995.*
Biswas, et al. "A conceptual clustering algorithm for data mining", IEEE, pp. 100-111, May 1998.*
I. E. Frank; "Modern Nonlinear Regression Methods"; Chemometrics and Intelligent Laboratory Systems, vol. 27; pp. 1-19, 1995.
Hwang, et al; "Hierarchical Discriminant Regression"; IEEE Transactions on Pattern Analysis and Machine Intelligence, vol. 22, No. 11, pp. 1277-1293; XP-002302472, Nov. 2000.
Jain, et al; "Feature Selection: Evaluation, Application, and Small Sample Performance"; IEEE Transactions on Pattern Analysis and Machine Intelligence, vol. 19, No. 2; pp. 153-158; XP-002294891, Feb. 1997.
E. Krusinska; "Two Step Semi-Optimal Branch and Bound Algorithm for Feature Selection in Mixed Variable Discrimination"; 1023 Pattern Recognition, vol. 22, No. 4, Head. Hill Hall, Oxford, GB; pp. 455-459; XP-000046518, 1989.

(Continued)

*Primary Examiner*—Daniel Mariam
(74) *Attorney, Agent, or Firm*—Baker Botts L.L.P.

(57) ABSTRACT

A method for feature selection based on hierarchical local-region analysis of feature characteristics in a data set of mixed data type is provided. A data space associated with a mixed-type data set is partitioned into a hierarchy of plural local regions. A relationship metric (for example, a similarity correlation metric) is used to evaluate for each local region a relationship measure between input features and a target. One or more relevant features is identified, by using the relationship measure for each local region.

13 Claims, 3 Drawing Sheets

OTHER PUBLICATIONS

P. M. Narandra et al.; "A Branch and Bound Algorithm for Feature Subset Selection"; IEEE Transactions on Computers, vol. C-26, No. 9; pp. 917-922; XP-0000647423, Sep. 1977.

Communication pursuant to Article 96(2) EPC (Appln. No. 04 777 558.0-1224), Jun. 1, 2006.

PCT Notification of Transmittal of the International Search Report and the Written Opinion of the International Searching Authority, or the Declaration, for International Application No. PCT/US2006/007158, 13 pages, Jul. 10, 2006.

Hall et al.; "Benchmarking Attribute Selection Techniques for Discrete Class Data Mining"; Knowledge and Data Engineering, vol. 15, No. 6; pp. 1437-1447; XP-002387331, Nov. 6, 2003.

P. Perner; "Improving the Accuracy of Decision Tree Induction by Feature Pre-Selection"; Applied Artificial Intelligence, vol. 15, No. 8; pp. 747-760; XP-002387332, 2001.

R. L. DeMantaras; "A Distance-Based Attribute Selection Measure for Decision Tree Induction"; Machine Learning, vol. 6; pp. 81-92; XP-008065823, 1991.

* cited by examiner

| | $x_1$ | $x_2$ | $x_3$ | $x_4$ | $x_5$ | $x_6$ | $x_7$ | $x_8$ | $x_9$ | $x_{10}$ |
|---|---|---|---|---|---|---|---|---|---|---|
| $y$ | 47.16 | 36.69 | 2.48 | 2.67 | 2.55 | 1.90 | 1.76 | 1.62 | 1.93 | 1.23 |

| | $x_1$ | $x_2$ | $x_3$ | $x_4$ | $x_5$ | $x_6$ |
|---|---|---|---|---|---|---|
| Monk-1 | 14.15 | 11.91 | 9.67 | 13.04 | 51.23 | 0.00 |
| Monk-3 | 5.31 | 36.60 | 7.84 | 7.35 | 33.32 | 9.58 |

HIERARCHICAL DETERMINATION OF FEATURE RELEVANCY FOR MIXED DATA TYPES

CROSS-REFERENCE TO RELATED APPLICATIONS

This application is a continuation-in-part of U.S. application Ser. No. 10/615,885, filed Jul. 8, 2003 and entitled "HIERARCHICAL DETERMINATION OF FEATURE RELEVANCY".

TECHNICAL FIELD

This application relates to pattern recognition and data mining. In particular, the application relates to determining feature relevancy in multivariate data analysis of a mixed-type data set.

DESCRIPTION OF RELATED ART

Feature selection is of theoretical interest and practical importance in the practice of pattern recognition and data mining. Objects or data entities may be described in terms of many features. However, some features may be redundant or irrelevant for specific tasks, serving primarily as a source of confusion. In addition, for any one specific task, different subsets of features might be relevant in different regions of input data space. Accordingly feature selection is a matter of considerable interest and importance in multivariate data analysis.

For example, in modeling a specific behavior of a given system, it is desirable to include only the parameters that contribute to that specific system behavior and not the ones that contribute to other behaviors of the system but are not much relevant to that specific behavior.

Most of feature selection algorithms are either filter methods or wrapper methods. Filter methods use the feature selection as a preprocessing step and filter out irrelevant features before learning a model. Thus, the filter methods are independent of the learning algorithm. Wrapper methods embed the learning algorithm within the feature selection process and use the learning algorithm to evaluate the performance of the feature selection. Each approach has both advantages and disadvantages. A filter approach is usually more efficient and can be combined with any learning algorithm, while a wrapper approach can usually provide a better performance for the learning algorithm.

In any event, conventional feature selection algorithms are typically adapted for processing of numerical features, but are not proficient for handling a data set of mixed data types. Improved methodologies for determining feature relevancy for mixed data types are needed.

SUMMARY

Methods for feature selection based on hierarchical local-region analysis of feature characteristics in a data set of mixed data type are described herein. A method for feature selection based on hierarchical local-region analysis of feature characteristics in a data set of mixed data type, according to one exemplary embodiment, comprises partitioning a data space associated with a mixed-type data set into a hierarchy of pluralities of local regions, using a relationship metric to evaluate for each local region a relationship measure between input features and a target, and identifying one or more relevant features, by using the relationship measure for each local region. The relationship metric preferably is or includes a similarity correlation metric (discussed below).

A similarity correlation metric can be used in methods for analyzing feature characteristics in a data set of mixed data type. According to an exemplary embodiment, a method for analyzing feature characteristics in a data set of mixed data type comprises mapping a data space associated with a mixed-type data set to a distance space, and determining a relationship measure between each input feature and the target by using a distance-based relationship measure. When a similarity correlation metric is used, the relationship measure is determined by using distance correlation.

The similarity correlation metric is provided to handle features of different data types, and facilitates analysis of feature relevancy by computing the correlations between input features and a target.

BRIEF DESCRIPTION OF THE DRAWINGS

The features of the present application can be more readily understood from the following detailed description with reference to the accompanying drawings wherein.

DETAILED DESCRIPTION

Figure 1A:
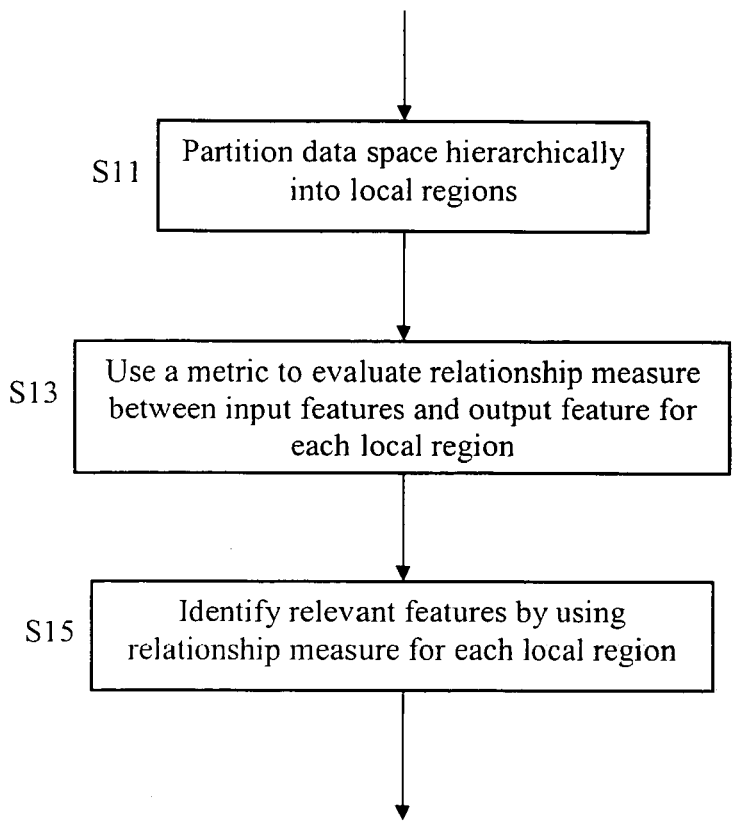
FIG. 1A shows a flow chart of a method for feature selection based on hierarchical local-region analysis of feature characteristics in a data set of mixed data type, according to an exemplary embodiment of the present application.

This application provides tools for determining feature relevancy of mixed data types in multivariate data analysis. The tools of this disclosure may be a computer program stored on a computer readable medium and/or transmitted via a computer network or other transmission medium.

A similarity correlation metric is discussed exemplarily below, as a new relevancy evaluation metric for an enhancement of the Hierarchical Determination of Feature Relevancy (HDFR) methodology which is discussed in U.S. application Ser. No. 10/615,885, filed Jul. 8, 2003 and entitled "HIERARCHICAL DETERMINATION OF FEATURE RELEVANCY", the entire contents of which are incorporated herein by reference. The enhanced HDFR methodology can be used to process features with mixed data types.

The Hierarchical Determination of Feature Relevancy (HDFR) methodology can be employed for feature selection based on hierarchical local-region analysis of feature characteristics. Hierarchical k-means clustering can be applied to partition the entire data space into local regions, which may or may not be overlapping, and then for each local region evaluates each feature individually based on its correlation with the target. In each local region there might be a particular, corresponding subset of features that is relevant according to the target for the local region. The subsets do not need to be the same for different regions of input data space. In other words, a feature or subset of features might not show strong relevancy to a particular task over the entire range of data but might show strong relevancy over different delineated regions. Such a feature is still considered relevant and can be identified for use in the appropriate regions.

A typical implementation of the HDFR methodology utilizes a linear correlation metric to evaluate the relevancy of a feature. The linear correlation metric computes the R-squared correlation between the feature and the target. However, the R-squared correlation computation is applied to numerical values. In order to use the linear correlation metric, non-numerical features (such as symbolic ones) are converted to numerical form by using conversion techniques such as, for example, cross tabulation. Cross tabulation converts a symbolic feature into many numerical features corresponding to the distinctive symbolic values. Such conversion often results in very large number of cross tabulated features with mostly 0 entries, which increases not only the computational cost but also the risks of discovering accidental relationships.

On the other hand, some advances have been made in handling non-numerical features in machine learning techniques. For example, as disclosed in U.S. application Ser. No. 10/418,659, filed Apr. 18, 2003 and entitled "PROCESSING MIXED NUMERIC AND NON-NUMERIC DATA", the entire contents of which are incorporated herein by reference, some similarity metrics such as set distance metric are designed to compute the distance of non-numerical values. Such similarity metrics can be used in learning methodologies such as hierarchical k-means clustering which can be utilized in the HDFR methodology. Therefore, the HDFR methodology can be adapted to have the capability of partitioning data space with non-numerical features. However, in order to evaluate relevancy of non-numerical features, a new relevancy evaluation metric other than the typical linear metric is desirable. A similarity correlation metric is discussed below as a new relevancy evaluation metric which adapts existing similarity metrics to compute the similarities of features and a target, and then computes the correlations between the similarities of input features and the similarities of the target.

A method for feature selection based on hierarchical local-region analysis of feature characteristics in a data set of mixed data type is described below with reference to FIG. 1A. A data space associated with a mixed-type data set is partitioned into a hierarchy of plural local regions (step S11). A relationship metric (for example, a similarity correlation metric) is used to evaluate for each local region a relationship measure between input features and a target (step S13). One or more relevant features is identified, by using the relationship measure for each local region (step S15). The relationship metric preferably includes a similarity correlation metric.

Figure 1B:
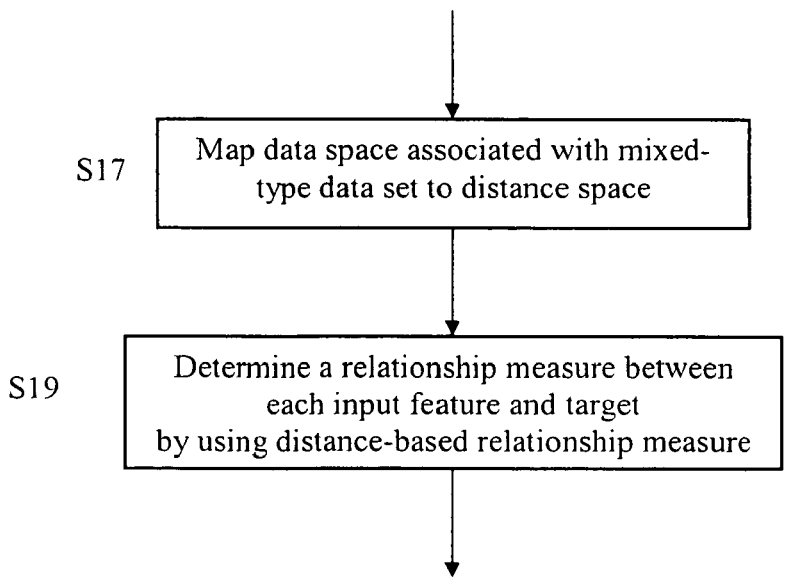
FIG. 1B shows a flow chart of a method for analyzing feature characteristics in a data set of mixed data type, according to an exemplary embodiment of the present application.

According to another embodiment, a method for analyzing feature characteristics in a data set of mixed data type (FIG. 1B) can be adapted to use the similarity correlation metric. A data space associated with a mixed-type data set is mapped to a distance space (step S17). A relationship measure between each input feature and the target is determined by using a distance-based relationship measure (step S19). When a similarity correlation metric is used, the relationship measure is determined by using distance correlation.

In typical implementations of HDFR (heretofore), the linear correlation metric was used to evaluate the feature relevancy. The linear correlation metric computes the R-squared correlation between a feature and the target. Assume a numerical input feature is x and the numerical target is y. The R-squared value between x and y represents the proportion of the variance in y attributable to the variance in x. Given observed pairs, $(x_i, y_i)$, $i=1\sim n$, the mathematical formulation of R-square value is:

$$RSQ = \frac{\left(\sum_i (x_i - \bar{x})(y_i - \bar{y})\right)^2}{\sum_i (x_i - \bar{x})^2 (y_i - \bar{y})^2} \quad (1)$$

where $\bar{x}$ and $\bar{y}$ are the mean of $x_i$s and $y_i$s

There is a limitation on the R-squared correlation computation that it can only apply to numerical values. This disclosure describes a new relevancy evaluation metric, the similarity correlation metric, to be used to evaluate relevancies of non-numerical features.

In Ser. No. 10/418,659, some similarity metrics are discussed to handle non-numerical data types. One example is the set distance metric. The set distance metric can compute the distance between two non-numerical values. It also proposed some methods to compute the center of a set of non-numerical values.

For a dimension covering symbolic data, the most likely distance metric is probably based on matching symbols. If a field of data points which corresponds to this dimension may be considered as a set, the following may be used as a distance metric between symbol sets A and B from two respective data points:

$$d = \frac{|A \cup B| - |A \cap B|}{|A \cup B|} \quad (1)$$

Equation (1) represents a simple symbol match scaled to satisfy the mathematical requirements of a distance metric. It works well when the dimension is composed of fields that have simple nominal values (for example, a dimension "car color" formed by the interior and exterior colors of a car in which only a limited number of colors are available from the manufacturer).

The above metric (Equation 1) may be generalized, if the value of a field cannot be considered as a simple set.

One example is a free text field in the problem of information classification. Since there are repeated words and some words may carry a larger weight for classification purposes, weights for each unique symbol may be introduced.

One method, which is compatible with Equation (1), using weights is proposed in Equation (2) as follows:

$$d = \frac{\sum_i^A w_{Ai} + \sum_j^B w_{Bj} - \sum_k^{A \cap B} (w_{Ak} + w_{Bk})}{\sum_i^A w_{Ai} + \sum_j^B w_{Bj} - \frac{1}{2}\sum_k^{A \cap B} (w_{Ak} + w_{Bk})} \quad (2)$$

where $w_{Ai}$ (and $w_{Ak}$) represents the weights associated with symbols Ai (and Ak) in symbol set A, $w_{Bj}$ (and $w_{Bk}$) represents the weights associated with symbols Bj and Bk in symbol set B. When each of the weights is equal to one, Equation (2) is reduced to the following:

$$d = \frac{|A| + |B| - 2|A \cap B|}{|A| + |B| - |A \cap B|} \quad (3)$$

Equation (3) is equivalent to Equation (1) since the following is true:

$$|A \cup B| = |A| + |B| - |A \cap B|$$

More elaborate distance metric may also be used for text processing. For example, when searching a database of textual information, it may be desired to keep a sequence of cue words. In this case, a penalty may be introduced if the sequence is broken, even if all cue words are present. This may drastically reduce the number of hits which are less interesting or not relevant at all.

The following steps may be easily expanded to work on other types of non-numerical data, if a reasonable distance metric can be defined.

The similarity correlation metric takes advantages of these mixed data handling techniques. Assume both the input feature x and the target y have non-numerical values. The similarity correlation metric first uses the similarity metric to compute the center of the observed values. Next, the distances of individual observations to the center are computed by the similarity metric, to obtain distance pairs, $(dist.x_i, dist.y_i)$, $i=1\sim n$, from the raw data pairs $(x_i, y_i)$. The similarity correlation metric measures the correlation between x and y using the distance correlation as in equation 2:

$$SCR = \frac{\left(\sum_i (dist.x_i - \overline{dist.x})(dist.y_i - \overline{dist.y})\right)^2}{\sum_i (dist.x_i - \overline{dist.x})^2 (dist.y_i - \overline{dist.y})^2} \quad (2)$$

where $\overline{dist.x}$ and $\overline{dist.y}$ are the mean of $dist.x_i$s and $dist.y_i$s Comparing equation 1 and 2, one can see that they are very similar. The similarity correlation metric is different from the linear correlation metric in that it actually computes the linear correlation in a mapped space, the distance space, rather than in the original raw data space.

Mapping from the raw data space to the distance space allows the methodology to evaluate numerically the relevancies of non-numerical features. This is an advantage of the similarity correlation metric over the linear correlation metric. The similarity correlation metric also has an advantage over the linear correlation metric in discovering a nonlinear relationship in the numerical data space, which is demonstrated by the following simple example.

Consider the simple nonlinear case $y=x^2$, where x is from $-\infty$ to $+\infty$. A R-squared correlation score of 0 is obtained by using the linear correlation metric which results from the cancellation of negative correlation of x and y when x is negative, and the positive correlation of x and y when x is positive. The similarity correlation metric uses two steps to evaluate correlation between x and y. First it maps the original space to the distance space. Assume the mean of x is 0. The mapping results in function $dist.y=(dist.x)^2$. The similarity correlation metric then computes the linear correlation between dist.x and dist.y. But due to the space mapping there is no more negative correlation between dist.x and dist.y. Therefore, a high similarity correlation score of 0.969 is obtained.

The effect of space mapping is similar to space partitioning under the HDFR methodology. The HDFR methodology can partition (x, y) space along axis x=0 and then compute the correlation between x and y in two partitioned spaces. The space mapping is to fold the original space along axis x=0 and y=0 and compute the correlation in the folded space. Both techniques can be targeted to identify the nonlinear relations.

This disclosure describes an enhancement to the HDFR methodology, utilizing the similarity correlation metric, to handle features with mixed data types. The enhanced HDFR methodology is designed to discover the feature relevancies of mixed data types. According to an exemplary embodiment of the enhanced HDFR methodology, a hierarchical k-means clustering is used to partition and transform data into groups of points in hyper-spherical local regions. The similarity correlation metric is used to evaluate the relevancies of input features of mixed data types. Relevancies of features over the local regions are summarized as the relevancies of input features.

Figure 2:
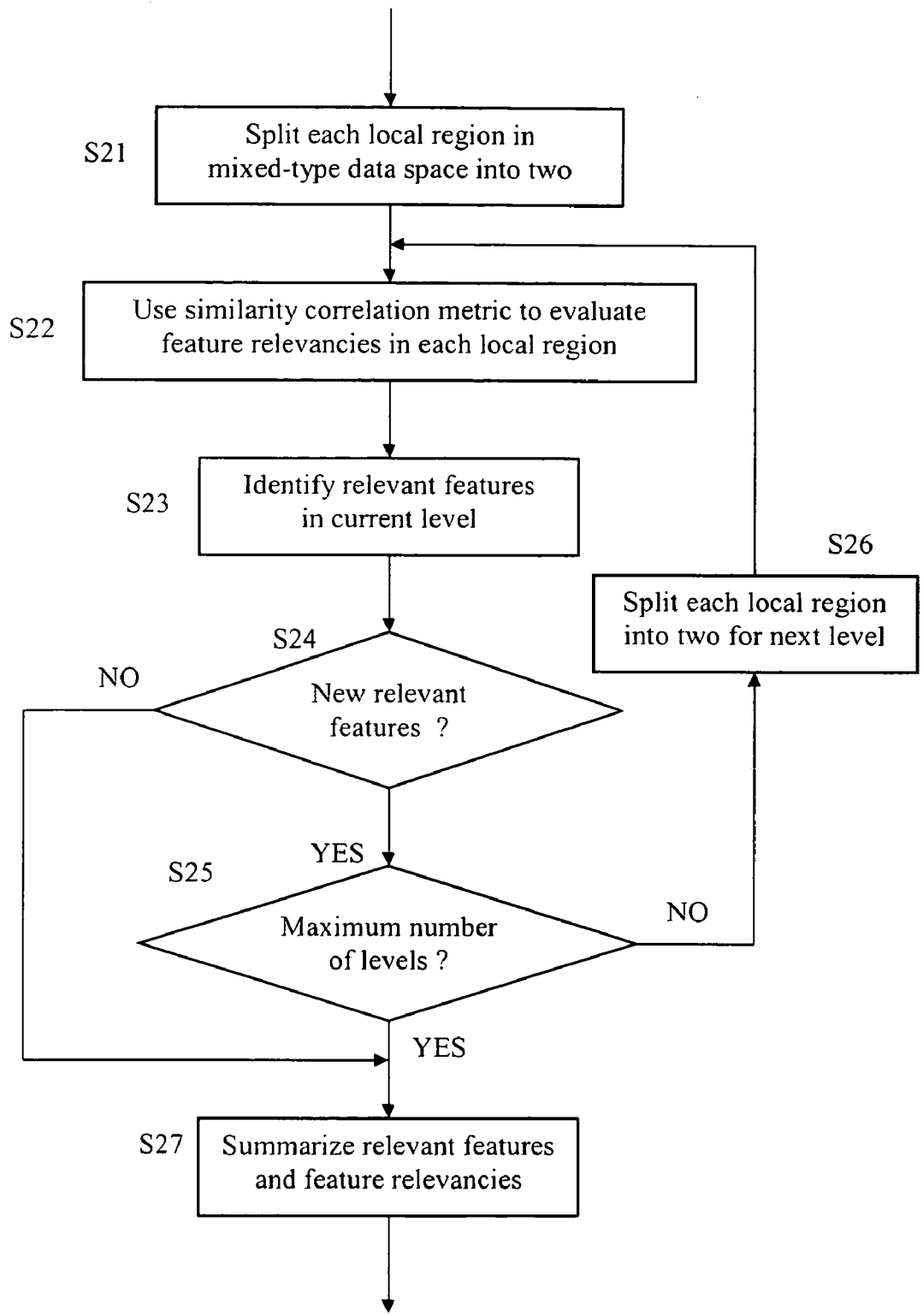
FIG. 2 shows a flow chart of another exemplary embodiment of a method for feature selection based on hierarchical local-region analysis of feature characteristics in a data set of mixed data type.

A flow chart of the enhanced HDFR methodology using a similarity correlation metric, according to an exemplary embodiment, is shown in FIG. 2. The mixed-type data space is partitioned initially into two regions (step S21). For each of the regions in the present level of the hierarchy, a similarity correlation metric is utilized to evaluate feature relevancies based on samples in the region (step S22). The feature relevancies in the level are used to identify relevant features which have significantly larger relevancies than the others (step S23). If no new relevant features can be identified for a certain number of levels (step S24, "NO") or a specified maximum number of levels is reached (step S25, "YES"), the feature relevancies can be summarized at all of the levels and a list of relevant features and their relevancies provided (step S27). The local regions in the current level are split further for the next level (step S26), until no new relevant features can be identified for a specified or predetermined number of iterations or a specified maximum number of levels is reached.

The performance of the enhanced HDFR methodology is discussed exemplarily through two examples below. One example is the extended parity-2 problem and the other is the three Monk's problems. The extended parity-2 problem is from the well-known parity-2 problem, but extended to use inputs and output of continuous values. Some random noise inputs are also added to see if the enhanced HDFR methodology can still work on numerical features. The three Monk's problems have been used as a standard for comparing many different learning methodologies. The problems have discrete input features and the first and the third problems can be used as feature selection tasks.

The parity-2 problem is a well-known problem. In this problem, the output is the mod-2 sum of two binary input features. It is extended by using continuous inputs and output. A nonlinear equation is used to simulate the problem:

$$y = x_1 + x_2 - 2*x_1*x_2$$

where $x_1$, $x_2$ and $y \in [0, 1]$

Figures 3, 4, 5:
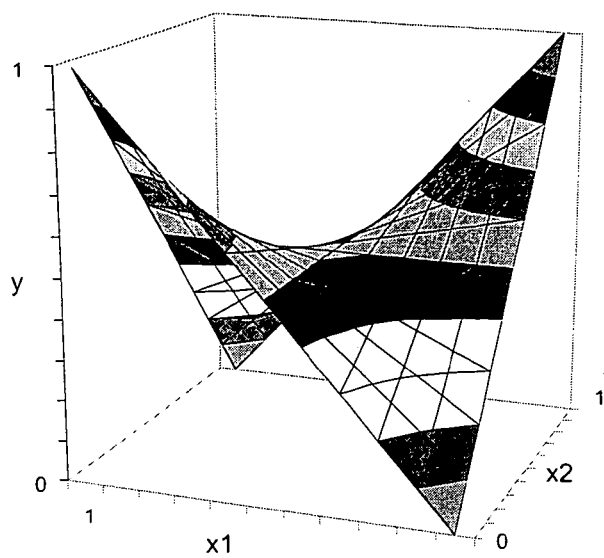
FIG. 3 shows a three-dimensional plot of an extended parity-2 problem.
FIG. 4 shows a table of feature relevancy values for an extended parity-2 problem, obtained by applying an exemplary embodiment of this application.
FIG. 5 shows a table of feature relevancy values for the Monk's problem, obtained by applying an exemplary embodiment of this application.

A 3-D plot of the above equation is shown in FIG. 3.

For testing purposes, 8 random input features, $x_3$ to $x_{10}$, are added as noise and 500 samples are randomly generated. The task is to identify the relevant features, $x_1$ and $x_2$, from the noise features, $x_3$ to $x_{10}$.

Estimated feature relevancies obtained by applying the enhanced HDFR methodology to the data of the extended parity-2 problem are shown tabularly in FIG. 4. The results show that the relevant features, $x_1$ and $x_2$, have significantly larger relevancy values than other noise features. This demonstrates that the enhanced HDFR methodology using a similarity correlation metric can still identify the relevant numerical features.

The Monk's problems have been used as a standard for comparing many different learning methodologies. There are six input features, $x_1, x_2, \ldots, x_6$, and one binary target y. Among the six input features, both feature $x_3$ and $x_6$ have only two discrete values and they are treated as binary numerical features. All of the other features have multiple discrete values and are treated as non-numerical features. The target y is binary and treated as numerical. The following is the definition of Monk's problems:

Monk-1: y=1 if $(x_1=x_2)$ or $(x_5=1)$, otherwise y=0.

Monk-2: y=1 if exactly two of $\{x_1=1, x_2=1, x_3=1, x_4=1, x_5=1, x_6=1\}$, otherwise y=0.

Monk-3: y=1 if $(x_5=3$ and $x_4=1)$ or $(x_5 \neq 4$ and $x_2 \neq 3)$, otherwise y=0 (5% class noise added to the training set).

From the definition one can check what features are relevant to the problems. For the first problem, one can see that only three features, $x_1$, $x_2$ and $x_5$, are relevant to the problem. For the second problem, all six features are relevant to the problem. For the third problem, three features, $x_2$, $x_4$ and $x_5$, are relevant to the problem. Therefore, the first and the third problem can be used as feature selection tasks. Exemplary feature relevancy values obtained by applying the enhanced HDFR methodology to the three Monk's problems is set forth in FIG. 5.

As can be seen from the estimated feature relevancies shown tabularly in FIG. 5, the ranks of feature $x_1$, $x_2$ and $x_5$ in the first problem are 2, 4 and 1 respectively. The ranks of feature $x_2$, $x_4$ and $x_5$ in the third problem are 1, 5 and 2 respectively. Feature $x_4$ in the third problem does not rank higher as might expect it to be. However, this is not surprising because the relevancy of feature $x_4$ is actually very small from the problem definition. Without feature $x_4$, only 12 out of 228 positive examples cannot be defined. Furthermore, the 5% class noise added to the dataset also diminishes the chance of methodologies to identify feature $x_4$ as a relevant feature.

This disclosure describes a new feature relevancy evaluation metric, the similarity correlation metric, which enhances the HDFR methodology, for handling features with mixed data types. Experiment results show that the enhanced HDFR methodology works well for features of both numerical and non-numerical data types.

The enhanced HDFR methodology can be adapted for any of various applications. For example, it can be integrated in a context-sensitive search engine. As another example, it can be adapted to be applied in intelligent software for monitoring electronic communications (such as e-mails, instant messages, other Internet communications, etc.). In addition, the enhanced HDFR methodology can be integrated in a system for cataloging textual information (such as news stories, books, scientific papers, etc.). It can be used by on-line book vendors to automatically suggest alternative titles when a book sought by a customer is not available (or even if it is available). Numerous other applications of the enhanced HDFR methodology are possible.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

Additional variations may be apparent to one of ordinary skill in the art from reading the following applications, the entire contents of which are incorporated herein by reference.

U.S. application Ser. No. 10/615,885, filed Jul. 8, 2003 and entitled "HIERARCHICAL DETERMINATION OF FEATURE RELEVANCY"; and U.S. application Ser. No. 10/418,659, filed Apr. 18, 2003 and entitled "PROCESSING MIXED NUMERIC AND NON-NUMERIC DATA".

What is claimed is:

1. A method for feature selection based on hierarchical local-region analysis of feature characteristics in a data set having at least one non-numeric feature, comprising:

partitioning a data space associated with the data set having at least one non-numeric feature into a hierarchy of pluralities of local regions;

evaluating a relationship measure for each local region using a metric based on relationship between input features and a target; and identifying one or more relevant features by using the relationship measure for each local region.

2. The method of claim 1, wherein the metric includes determining for each local region a center of data from said data set in the local region.

3. The method of claim 2, wherein the metric includes determining for each local region distances between respective data points in the local region and the center of the local region.

4. The method of claim 3, wherein the metric maps the data space associated with the data set to a distance space, and determines a correlation between each input feature and the target by using a distance correlation.

5. The method of claim 1, wherein the metric includes a similarity correlation metric.

6. A computer system, comprising:

a processor; and a program storage device readable by the computer system, tangibly embodying a program of instructions executable by the processor to perform the method claimed in claim 1.

7. A program storage device readable by a machine, tangibly embodying a program of instructions executable by the machine to perform the method claimed in claim 1.

8. An apparatus for feature selection based on hierarchical local-region analysis of feature characteristics in a data set having at least one non-numeric feature, comprising:

partition means for participating a data space associated with the data set having at least one non-numeric feature into a hierarchy of pluralities of local regions;

evaluation means for evaluating a relationship measure for each local region using a metric based on relationship between input features and a target; and relevant feature identification means for identifying one or more relevant features by using the relationship measure for each local region.

9. The apparatus of claim 8, wherein the metric includes a similarity correlation metric.

10. A method for analyzing feature characteristics in a data set having at least one non-numeric feature, comprising:

partitioning a data space associated with the data set having at least one non-numeric feature into a hierarchy of pluralities of local regions;

mapping a data space associated with the data set having at least one non-numeric feature to a distance space; and determining a relationship measure between each input feature and the target by using a distance-based relationship measure.

11. The method of claim 10, wherein the distance-based relationship measure is a distance correlation.

12. A computer system, comprising:
a processor; and
a program storage device readable by the computer system, tangibly embodying a program of instructions executable by the processor to perform the method claimed in claim 10.

13. A program storage device readable by a machine, tangibly embodying a program of instructions executable by the machine to perform the method claimed in claim 10.

* * * * *